(12) United States Patent
Joly et al.

(10) Patent No.: US 7,186,779 B2
(45) Date of Patent: Mar. 6, 2007

(54) BLOCK COPOLYMER COMPOSITIONS, HAVING IMPROVED MECHANICAL PROPERTIES AND PROCESSABILITY

(75) Inventors: Gert Joly, Louvain-la-Neuve (BE); Jacques Moerenhout, Louvain-la-Neuve (BE); Catherine A. L. Maris, Louvain-la-Neuve (BE); Sonja M. Oosterbosch, Louvain-la-Neuve (BE)

(73) Assignee: Kraton Polymers U.S. LLC, Houston, TX (US)

( * ) Notice: Subject to any disclaimer, the term of this patent is extended or adjusted under 35 U.S.C. 154(b) by 0 days.

(21) Appl. No.: 10/510,360

(22) PCT Filed: Jan. 13, 2003

(86) PCT No.: PCT/EP03/00278

§ 371 (c)(1),
(2), (4) Date: Apr. 25, 2005

(87) PCT Pub. No.: WO03/064528

PCT Pub. Date: Aug. 7, 2003

(65) Prior Publication Data

US 2005/0222356 A1    Oct. 6, 2005

(30) Foreign Application Priority Data

Jan. 31, 2002 (EP) .................. 02075463
Oct. 24, 2002 (EP) .................. 02079462

(51) Int. Cl.
*C08F 297/04* (2006.01)
*C08F 8/04* (2006.01)

(52) U.S. Cl. .................. 525/98; 525/314; 525/338; 525/914

(58) Field of Classification Search .................. 525/98, 525/314, 338, 914
See application file for complete search history.

(56) References Cited

U.S. PATENT DOCUMENTS

| 3,113,986 A | 12/1963 | Breslow et al. |
| RE27,145 E | 6/1971 | Jones |
| 4,226,952 A | 10/1980 | Halasa et al. |
| 4,663,220 A | 5/1987 | Wisneski et al. |
| 4,789,699 A | 12/1988 | Kieffer et al. |
| 4,970,259 A | 11/1990 | Mitchell et al. |
| 5,039,755 A | 8/1991 | Chamberlain et al. |
| 5,093,422 A | 3/1992 | Himes |
| 5,346,964 A | 9/1994 | Shibata et al. |
| 5,627,235 A | 5/1997 | Himes |
| 5,705,556 A | 1/1998 | Dijauw et al. |
| 5,777,031 A * | 7/1998 | Djiauw et al. ............ 525/98 |
| 5,777,043 A | 7/1998 | Shafer et al. |
| 6,042,907 A | 3/2000 | Blackwelder et al. |
| 6,406,653 B1 | 6/2002 | Blackwelder et al. |

FOREIGN PATENT DOCUMENTS

| EP | 0 254 346 B1 | 1/1993 |
| EP | 0 413 262 B1 | 1/1996 |
| EP | 0 822 227 A1 | 2/1998 |
| EP | 1 061 099 A1 | 12/2000 |
| EP | 0 863 193 B1 | 12/2002 |
| WO | 01/09239 A1 | 2/2001 |
| WO | 01/19919 A1 | 3/2001 |
| WO | 02/28965 A1 | 4/2002 |

* cited by examiner

*Primary Examiner*—Fred Teskin
(74) *Attorney, Agent, or Firm*—Donna B. Holguin

(57) ABSTRACT

A composition to be used for the manufacture of mono- or multilayer films for food-wrap applications comprising from 5 to 40 wt % of a styrenic block copolymer, a polyolefin in an amount of at least 40 wt % and optionally a resin which is compatible with the hydrogenated poly(butadiene) blocks of the styrenic block copolymer in an amount of from 0 to 25 % wt, wherein all weight percentages are relative to the weight of the complete composition; a styrenic block copolymer to be used in said composition, and mono- or multi-layer films comprising said composition.

18 Claims, No Drawings

BLOCK COPOLYMER COMPOSITIONS, HAVING IMPROVED MECHANICAL PROPERTIES AND PROCESSABILITY

FIELD OF THE INVENTION

The invention relates to block copolymer compositions, having improved mechanical properties and processability, and to modified styrenic block copolymers to be used therein.

In particular, the invention relates to compositions to be used for the manufacture of mono- or multi-layer films for food wrap applications, comprising a modified hydrogenated styrene-butadiene block copolymer.

The invention also relates to the preparation of films for food wrap application and to said films themselves.

BACKGROUND OF THE INVENTION

Elastomeric compounds which can be easily extruded, spunbond or melt blown into elastic fibers or films having low stress relaxation, low hysteresis or permanent set, and high recoverable energy are described in U.S. Pat. Nos. 4,663,220, 4,789,699, 4,970,259, 5,093,422, 5,705,556 and many others. The elastomeric fibers or films are useful in making a variety of applications such as diaper waistbands and non-woven fabrics.

Polystyrene-poly(ethylene-butylene)-polystyrene elastomeric block copolymers have been compounded with other materials such as, for example, polyolefins and tackifying resins to form extrudable elastomeric compositions which can be more easily extruded into elastic fibers or films having improved processing and/or bonding properties. Processes for making cast extruded films, extrusion blown films, extruded fibers, filaments, non-wovens and such like have high requirements around viscosity of the compound. At the same time, applications of these extrudates in personal hygiene, food wrapping and the like result in stringent requirements on mechanical behavior; a combination of stiffness (high modulus), and excellent elasticity (good stress-relaxation and low hysteresis and permanent set) is needed. One of the greatest challenges in this field is to find a good balance between flow/viscosity and the mechanical properties mentioned above.

It is an object of the present invention to provide compositions that have excellent balance of mechanical properties and results in low anisotropy in films derived from them: i.e. the properties of the final film are (almost) equal when measured in machine direction (MD) or traverse direction (TD).

It is also an object of the present invention to provide modified styrene-butadiene block copolymers to be used in said compositions.

SUMMARY OF THE INVENTION

Accordingly, a composition is provide to be used for the manufacture of mono- or multilayer films, wherein a core layer as formed from said composition, for food wrap applications, comprising from 5 to 25 wt % of a styrenic block copolymer, having a molecular structure according to the general formulae S–EB–S (1) or (S–EB)$_n$X (2), wherein each S independently is a polymer block of predominantly styrene and EB is a hydrogenated polymer block of predominantly butadiene, n is an integer equal to or greater than 2, and X is the residue of a coupling agent, having predominantly poly(styrene) blocks (S) of an apparent molecular weight in the range of from 6,000 to 9,000, having an apparent molecular weight of the complete block copolymer in the range of from 80,000 to 150,000 having an 1,2-addition degree (vinyl content) in the precursor of the poly(butadiene) block (EB) in the range of from 60 to 80% (mole/mole), wherein the block EB has a hydrogenation degree of at least 80% and preferably at least 90% and wherein diblock S–EB optionally occurs in a content of at most 20 mole % and preferably at most 10 mole %, a polyolefin in an amount of at least 40 wt % and optionally a resin which is compatible with the hydrogenated poly (butadiene) blocks in an amount of up to 25% wt, wherein all weight percentages are relative to the weight of the complete composition.

In addition, a styrenic block copolymer is provided, wherein
i. the poly(styrene) content (PSC) is from 17 to 24 wt %,
ii. the styrenic block copolymer has a molecular structure according to the general formulae
  S–EB–S (1) or (S–EB)$_n$X (2), wherein each S independently is a polymer block of styrene and EB is a hydrogenated polymer block of butadiene, n is an integer equal to or greater than 2, and X is the residue of a coupling agent,
iii. the apparent molecular weight of the poly(styrene) blocks (S) is in the range of from 7,500 to 8,500,
iv. the apparent molecular weight of the complete styrenic block copolymer is in the range of from 80,000 to 150,000,
v. the 1,2 addition degree (vinyl content) in the poly (butadiene) block (EB) precursor is in the range of from 60 to 80 (mole/mole),
vi. the block EB has a hydrogenation of at least 80% and preferably of at least 90%, and
vii. an optional diblock S–EB content of at most 20 mole % and preferably of at most 10 mole %, relative to the total block copolymer amount.

DETAILED DESCRIPTION OF THE INVENTION

The compositions of the present invention comprise from 5 to 40 wt % of at least one styrenic block copolymer as specified hereinbefore, preferably from 15 to 30 wt %; at least 40 wt % of a polyolefin, preferably from 40 to 85 wt % and more preferably from 50 to 80 wt %; and optionally a hydrogenated poly(butadiene) compatible resin in an amount of from 0 to 25 wt %, preferably from 1 to 25 wt % and more preferably from 1 to 10 wt %.

With the terms "predominantly styrene" and "predominantly butadiene" respectively, as used throughout the specification, are meant that for the respective blocks to be prepared, substantially pure styrene or mixtures comprising at least 95 wt % of styrene and minor amounts of other comonomers can be used, and substantially pure butadiene or mixtures comprising at least 95 wt % of butadiene and minor amounts of other comonomers, can be used.

The small proportions of other comonomers in the polystyrene blocks can consist of structurally related comonomers such as alpha-methyl styrene, p-methyl styrene, o-methyl styrene, p-test.butyl styrene, dimethyl styrene and vinyl naphthalene, or butadiene.

The small proportions of other comonomers in the poly (butadiene) block can consist of isoprene or styrene.

However, preferred block copolymers to be applied according to the present invention, contain blocks of substantially pure styrene and substantially pure butadiene.

The block copolymer according to the present invention may be branched or linear and may be a triblock, tetrablock or multiblock.

It has a structure represented by the following general formulae

S–EB–S (1) or (S–EB)$_n$X (2) wherein each S independently is a polymer block predominantly styrene, and EB is a hydrogenated polymer block of predominant butadiene, having a hydrogenation degree of at least 80%, preferably at least 90% and more preferably more than 95%, wherein n is an integer equal to or greater than 2 and wherein X is the residue of a coupling agent.

The polymer blocks S have an apparent molecular weight in the range of from 6,000 to 9,000 and preferably from 7,500 to 8,500.

In the block copolymers according to the present invention, the PSC is in the range of 10–29% w, preferably 17–24% w based on the total block copolymer. The 1,2 addition (vinyl content) in the midblock precursor is in the range of 60 to 80%, preferably in the range of 65 to 75%.

The complete block copolymers according to the present invention each preferably have a total apparent molecular weight (Mw, determined by Gel Permeation Chromatography and expressed in terms of polystyrene) ranging from 80,000 to 150,000, preferably from 100,000 to 120,000 (using the method described by J. R. Runyon et al in J. Polym. Sci., 13, 2359 (1969)).

The block copolymers according to the present invention can be made e.g. by coupling living diblock copolymer prepared by anionic polymerization with a coupling agent or by sequential polymerization. The latter is preferred.

It will be appreciated thet block copolymers, prepared by means of coupling of living diblock copolymers by means of a coupling agent and termination of remaining living block copolymers, will finally contain small amounts (i.e. less than 20 mole % and preferably less than 10 mole %) of diblock copolymer, having the same S blocks (mole % relative to the weight of the total block copolymer).

Preferred block copolymers to be used in the compositions of the present invention do not contain any detectable amount of diblock copolymer.

As examples of the coupling agent may be mentioned tin coupling agents such as tin dichloride, monomethyltin dichloride, dimethyltin dichloride, monoethyltin dichloride, diethyltin dichloride, methyltin trichloride, monobutyltin dichloride, dibutyltin dibromide, monohexyltin dichloride and tin tetrachloride; halogenated silicon coupling agents such as dichlorosilane, monomethyldichlorosilane, dimethyldichlorosilane, diethyldichlorosilane, monobutyldichlorosilane, dibutyldichlorosilane, monohexyldichlorosilane, dihexyldichlorosilane, dibromosilane, monomethyldibromosilane, dimethyldibromosilane, silicon tetrachloride and silicon tetrabromide; alkoxysilanes such as tetramethoxysilane; divinyl aromatic compounds such as divinylbenzene en divinyl naphthalene; halogenated alkanes such as dichloroethane, dibromoethane, methylene chloride dibromomethane, dichloropropane, dibromopropane, chloroform, trichloroethane, trichloropropane and tribromopropane; halogenated aromatic compounds such as dibromobenzene; epoxy xompounds such as the diglycidyl ether of bisphenol-A (e.g. EPON 825, a trademark), and other coupling agents such as benzoic esters, $CO_2$, 2 chloroprene and 1 chloro-1,3-butadiene.

Of these EPON 825, diglycidyl ether, dibromobenzene, tetramethoxysilane and dimethyldichlorosilane are preferred.

The anionic polymerization of the conjugated diene hydrocarbons is typically controlled with structure modifiers such as diethyl ether or ethyl glyme (1,2-diethoxyethane), to obtain the desired amount of 1.2-addition. As described in Re 27,145 which is incorporated by reference herein, the level of 1,2-addition of a butadiene polymer or copolymer can greatly affect elastomeric properties after hydrogenation. The 1,2-addition of butadiene polymers significantly and surprisingly addirionally influences the polymer as described above. More in particular, a 1,2-addition of 78% (within the scope of this invention) is achieved during polymerization by the presence of about 300 ppm of 1,2-diethoxypropane (DEP) in the final solution.

In general, the polymers useful in this invention may be prepared by contacting the monomer or monomers with an organoalkali metal compound in a suitable solvent at a temperature within the range from −150° C. to 300° C., preferably at a temperature within the range from 0° C. to 100° C. Particularly effective polymerization initiators are organolithium compounds having the general formula RIi wherein R is an aliphatic,cycloaliphatic, alkyl-substituted cycloaliphatic, aromatic or alkyl-substituted aromatic hydrocarbon radical having from 1 to 20 carbon atoms of which sec.butyl is preferred.

Suitable solvents include those useful in the solution polymerization of the polymer and include aliphatic, cycloaliphatic, alkyl-substituted cycloaliphatic, aromatic and alkyl-substituted aromatic hydrocarbons, ethers and mixtures thereof. Suitable solvents, then, include aliphatic hydrocarbons such as butane, pentane, hexane and heptane, cycloaliphatic hydrocarbons such as cyclopentane, cyclohexane and cycloheptane, alkyl-substituted cycloaliphatic hydrocarbons such as methylcyclohexane and methylcycloheptane, aromatic hydrocarbons such as benzene and the alkyl-substituted hydrocarbons such as toluene and xylene, and ethers such as tetrahydrofuran, diethylether and di-n-butyl ether. Preferred solvents are cyclopentane or cyclohexane.

It will be appreciated that the EB blocks in the finally applied block copolymers preferably have been selectively hydrogenated to a degree of at least 95%, whereas the poly(styrene) blocks have not been hydrogenated or only in a degree of at most 5%.

The hydrogenation of these polymers may be carried out by a variety of well established processes including hydrogenation in the presence of such catalysts as Raney Nickel, noble metals such as platinum and palladium and soluble transition metal catalysts. Suitable hydrogenation processes which can be used are ones wherein the diene-containing polymer or copolymer is dissolved in an inert hydrocarbon diluent such as cyclohexane and hydrogenated by reaction with hydrogen in the present of a soluble hydrogenation catalyst. Such processes are disclosed in U.S. Pat. Nos. 3,113,986, 4,226,952 and Reissues 27,145, the disclosure of which are herein incorporated by reference. The polymers are hydrogenated in such a manner as to produce hydrogenated polymers having a residual unsaturation content in polydiene blocks of less than 5 percent by weight, preferably less than 1% wt and more preferably as close to 0 percent as possible, of their original unsaturation contant prior to hydrogenation. A titanium catalyst such as disclosed in U.S. Pat. No. 5,039,755, which is herein incorporated by reference, may also be used in the hydrogenation process.

The finally applied selectively hydrogenated block copolymers can also consist of mixtures of linear block copolymers or of mixtures of linear block copolymer and branched block copolymers.

The polyolefin used in the compositions of the present invention is preferably polypropylene (PP) or polyethylene (PE).

The polyolefin is preferably a random PP copolymer, most preferable a copolymer of propylene and ethylene, with flexural modulus smaller than 300 MPa (ASTM D-790).

Resins compatible with the hydrogenated polybutadiene (mid)block may be selected from the group consisting of compatible $C_5$ hydrocarbon resins, hydrogenated $C_5$ hydrocarbon resins, styrenated $C_5$ resins, $C_5/C_9$ resins, styrenated terpene resins, fully hydrogenated or partially hydrogenated $C_9$ hydrocarbon resins, rosins esters, rosins derivatives and mixtures thereof. These resins are e.g. sold under the trademarks "REGALITE", "REGALREZ", "ESCOREZ" and "ARKON". A very suitable resin is "REGALITE" R-1125. The compound preferably comprises from 1 to 10% w of the (mid)block compatible resin.

It will be appreciated that another aspect of the present invention are formed by the monolayer or multilayer films, obtained by processing the hereinbefore defined compositions.

A further aspect of the present invention is formed by the specific block copolymers to be used in the compositions for the manufacture of monolayer or multilayer films.

The compositions of present invention may contain, if desired, a plasticizer. However, as plasticizers have the tendency to migrate, their presence is typically to be avoided.

Other ingredients may be incorporated into the compositions according to the present invention. For instance, processing aids can be added or colorants, as well as antioxidants and other stabilizing ingredients to protect the compounds from degradation induced by heat, light and processing or during storage.

Preparation of the Composition

No particular limitation is imposed on the preparation process of the compound of the present invention. Therefore, there may be used any process such as a mechanically mixing process: e.g., a Banbury mixer or twin-screw extruder provided with adequate mixing elements, thereby obtaining an intimate mixture of the ingredients.

Use of the Composition

Compositions according to the present invention may be applied, e.g. by extrusion, for the preparation of monolayer or multilayer films.

The present invention will hereinafter be described more specifically by reference to the following examples and comparative examples. However, this invention is not limited to these examples only. Incidentally, all designations of "part" or "parts" and "%" as will be used in the following examples mean part or parts by weight and percentage by weight unless expressly noted. The measurements of physical properties were conducted in accordance with the following methods.

Test Methods melt flow rate (MFR): ASTM D1238-95 (230° C., 2.16 kg)

tensile properties according to ASTM D882-81 (tested on films)

TABLE 1

(ingredients)

| | |
|---|---|
| Styrenic Block copolymers: | |
| SBC A Comp | A linear SEBS having a diblock content of about 30%; a PSC of 13.3%, a MW (PS) of about 5,300; an apparent MW of about 145,000 and a vinyl content of 45% |
| SBC B | SEBS having a diblock content of about 30%; a PSC of 13.3%, a MW (PS) of about 5,300; an apparent MW of about 145,000 and a vinyl content of 45% |
| SBC C Comp | A linear SEBS having a PSC of 20.5%, a MW (PS) of about 10,000; an apparent MW of about 150,000 and a vinyl content of 68% |
| SBC D | A linear SEBS having a PSC of 21%, a MW (PS) of about 7,000; an apparent MW of about 110,000 and a vinyl content of 74% |
| Polyolefins: | |
| Q100 F | "ADFLEX" Q100F, a random polypropylene copolymer having an MFR of 0.6 g/10 min and a Modulus of 80 MPa |
| Midblock compatible resins: | |
| R-1125 | "REGALITE" R-1125; a fully hydrogenated C9 hydrocarbon resin |
| ARKON P125 | a fully hydrogenated $C_9$ hydrocarbon resin |

EXAMPLES 1–3

Compositions according to the present invention were prepared on a 25 mm Werner & Pfleiderer ZSK25 co-rotating twin-screw extruder with 49 L/D. The ingredients from Table 1 were pre-blended according to the amounts in Table 2 in a Papenmeier internal mixer, and fed into one feeding port. Strands were cooled in a water-bath and granulated using a strand-cutter. These compounds were used for film blowing on a Plastik Maschinebau equipment. (The ingredients may also be fed directly into the feeding system of the film blowing line.)

In Table 2 the properties are listed of a monolayer blown film (2*15 μm thick) produced with a blow up ratio of 2.4 using an extruder with a die gap of 1 mm.

Conclusion

All these formulations could be successfully blown into monolayer films. These films have no yield point in the tensile graph, whereas a pure Adflex Q100F film has. Example 2 additionally has good mechanical properties, combined with low anisotropy, which is an advantage for applications where the film is stretched in the two directions, like food-wrap film.

It will be appreciated that monolayer films can also be successfully applied as core layer in a sandwich film in combination with external layers of polyolefin or EVA polymers as illustrated in Example 4 and comparative examples A and B.

TABLE 2

Properties of a monolayer film

| Examples | 1 | 2 | 3 |
|---|---|---|---|
| Q100F | 80 | 80 | 80 |
| SBC A | 20 | | |
| SBC C | | | 20 |
| SBC D | | 20 | |

TABLE 2-continued

Properties of a monolayer film

| Properties | MD | TD | MD | TD | MD | TD |
|---|---|---|---|---|---|---|
| Modulus 100% MPa | 5.7 | 3.9 | 5.2 | 4.7 | 6.3 | 4.7 |
| Modulus 300% MPa | 9.5 | 4.9 | 6.8 | 5.8 | 10.1 | 6.3 |
| Modulus 500% MPa | 18.1 | 6.9 | 17.5 | 9.0 | 17.5 | 9.0 |
| Tensile strength MPa | 22.5 | 18.5 | 21.1 | 18.0 | 26.8 | 24.0 |
| Elongation at break % | 580 | 1000 | 920 | 1080 | 660 | 1010 |
| Anisotropy in elong. at break (TD/MD) | 1.7 | | 1.2 | | 1.5 | |

EXAMPLE 4

A composition, comprising 30 wt % of block copolymer B (according to the present invention), 50 wt % of random poly(propylene) and 20 wt % ARKON P125 (a resin compatible with the hydrogenated polt(butadiene) blocks was prepared by mixing the ingredients in an extruder.

On a blown film equipment a multilayer film was produced having two outer layers of EVA polymer and one core layer of the beforementioned composition.

The three layers had the following ratio: 1:1.5:1.

The produced film had a thickness of 11 micron and showed the following mechanical properties:

| Tensile strength | MD | 32 MPa |
|---|---|---|
| | TD | 32 MPa |
| Elongation at break | MD | 320% |
| | TD | 470% |

Thus said film showed a high strength combined with a low level of anisotropy.

COMPARATIVE EXAMPLES A AND B

Similar three layer films were prepared under the same conditions, having two outer layers of EVA polymer and a core layer derived from compositions as listed below.

| | | |
|---|---|---|
| A | Random PP | 50 wt % |
| | KRATON G-1657 blockcopolymer | 30 wt % |
| | ARKON P125 resin | 20 wt % |
| | and | |
| B | KRATON G 1657 blockcopolymer | 30 wt % |
| | ADFLEX Q100F resin | 70 wt % |

The mechanical properties of both produced films, having a thickness of 11 micron, have been listed below

| | | core layer A | | core layer B |
|---|---|---|---|---|
| Tensile strenght | MD | 27 MPa | MD | 27 Mpa |
| | TD | 19 MPa | TD | 18 Mpa |
| Elongation at break | MD | 245% | MD | 210% |
| | TD | 860% | TD | 580% |

The invention claimed is:

1. A composition to be used for the manufacture of mono- or multilayer films for food-wrap applications comprising from 5 to 40 wt % of a styrenic block copolymer, having a molecular structure according to the general formulae S–EB–(1) or (S–EB)$_n$X(2), wherein each S independently is a polymer block of predominantly styrene and EB is a hydrogenated polymer block of predominantly butadiene, n is an integer equal to or greater than 2, and X is the residue of a coupling agent, having a poly(styrene) content of from 10 to 29 wt %, having poly(styrene) blocks (5) of an apparent molecular weight in the range of from 6,000 to 9,000, having an apparent molecular weight of the complete block copolymer in the range of from 80,000 to 150,000 having an 1,2-addition degree (vinyl content) in the precursor of the poly(butadiene) block (EB) in the range of from 60 to 80% (mole/mole), wherein the block EB has a hydrogenation degree of at least 80% and wherein diblock S–EB optionally occurs in a content of at most 20 mole %, a polyolefin in an amount of at least 40 wt % and optionally a resin which is compatible with the hydrogenated poly (butadiene) blocks in an amount of from 0 to 25% wt, wherein all weight percentages are relative to the weight of the complete composition.

2. The composition of claim 1, wherein the poly(styrene) content is in a range of from 17 to 24 wt %.

3. The composition of claim 2, wherein the block EB has a hydrogenation degree of at least 90%.

4. The composition of claim 2, wherein diblock S–EB optionally occurs in a content of at most 10 mole %.

5. The composition of claim 1, wherein the polyolefin is a random propylene copolymer with a flexural modulus smaller than 300 MPa (ASTM-D-790).

6. The composition of claim 5, wherein the polyolefin is a copolymer of propylene and ethylene, having a flexural modulus smaller than 300 MPa (ASTM-D-790).

7. Mono- or multilayer film comprising at least one layer based on a composition comprising from 5 to 40 wt % of a syrenic block copolymer, having a molecular structure according to the general S–EB–S(1) or (S–EB)$_n$X(2), wherein each S independently is a polymer block of predominantly styrene and EB is a hydrogenated polymer block of predominantly butadiene, n is an integer equal to or greater than 2, and X is the residue of a coupling agent, having a poly(styrene) content of from 10 to 29 wt %, having poly(styrene) blocks (S) of an apparent molecular weight in the range of from 6,000 to 9,000, having an apparent molecular weight of the complete block copolymer in the range of from 80,000 to 150,000 having an 1,2-addition degree (vinyl content) in the precursor of the poly(butadiene) block (EB) in the range of from 60 to 80% (mole/mole), wherein the block EB has a hydrogenation degree of at least 80% and wherein diblock S–EB optionally occurs in a content of at most 20 mole %, a polyolefin in an amount of at least 40 wt % and optionally a resin which is compatible with the hydrogenated poly(butadiene) blocks in an amount of from 0 to 25% wt, wherein all weight percentages are relative to the weight of the complete composition.

8. The composition of claim 1, wherein the polymer block S have an apparent molecular weight in the range of from 7,500 to 8,500.

9. The composition of claim 1, wherein the apparent molecular weight of the complete block copolymer is from 100,000 to 120,000.

10. The composition of claim 1, wherein the 1,2-addition degree in the EB block precursor is in the range of from 65 to 75%.

11. The composition of claim 7, wherein the poly(styrene) content is in a range of from 17 to 24 wt %.

12. The composition of claim 11, wherein the block EB has a hydrogenation degree of at least 90%.

13. The composition of claim 11, wherein diblock S–EB optionally occurs in a content of at most 10 mole %.

14. The composition of claim 7, wherein the polyolefin is a random propylene copolymer with a flexural modulus smaller than 300 MPa (ASTM-D-790).

15. The composition of claim 14, wherein the polyolefin is a copolymer of propylene and ethylene, having a flexural modulus smaller than 300 MPa (ASTM-D-790).

16. The composition of claim 7, wherein the polymer block S have an apparent molecular weight in the range of from 7,500 to 8,500.

17. The composition of claim 7, wherein the apparent molecular weight of the complete block copolymer is from 100,000 to 120,000.

18. The composition of claim 7, wherein the 1,2-addition degree in the EB block precursor is in the range of from 65 to 75%.

* * * * *